United States Patent
Cosentino et al.

(10) Patent No.: US 12,556,513 B2
(45) Date of Patent: Feb. 17, 2026

(54) SECRETS MANAGEMENT TOPOLOGY MIGRATOR

(71) Applicant: Red Hat, Inc., Raleigh, NC (US)

(72) Inventors: Andrea Cosentino, Milan (IT); Paolo Antinori, Milan (IT); Leigh Griffin, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 449 days.

(21) Appl. No.: 18/198,402

(22) Filed: May 17, 2023

(65) Prior Publication Data
US 2024/0388569 A1 Nov. 21, 2024

(51) Int. Cl.
*H04L 9/40* (2022.01)

(52) U.S. Cl.
CPC ........ *H04L 63/0263* (2013.01); *H04L 63/107* (2013.01); *H04L 63/20* (2013.01)

(58) Field of Classification Search
CPC .... H04L 63/20; H04L 63/0263; H04L 63/107
See application file for complete search history.

(56) References Cited

U.S. PATENT DOCUMENTS

| | | | |
|---|---|---|---|
| 9,197,517 B2 | 11/2015 | Ravichandran et al. | |
| 11,625,368 B1* | 4/2023 | Kushtagi | H04L 9/3247 |
| | | | 707/609 |
| 2020/0293697 A1* | 9/2020 | Sion | H04L 63/10 |
| 2022/0271933 A1* | 8/2022 | Chen | H04L 9/085 |
| 2022/0318072 A1* | 10/2022 | Li | H04L 67/60 |

OTHER PUBLICATIONS

Brian Grant, "Key Repatriation, the first step in re-establishing Cloud Data Digital Sovereignty", Thales, May 5, 2022, 3 pages, accessed on Aug. 16, 2023, accessed at: https://cpl.thalesgroup.com/blog/cloud-security/re-establish-data-sovereignty-in-the-cloud.

* cited by examiner

*Primary Examiner* — Thaddeus J Plecha
(74) *Attorney, Agent, or Firm* — Kilpatrick Townsend & Stockton LLP

(57) ABSTRACT

Systems, methods, and apparatuses for migrating secrets from cloud-based secret manager instances to local secret manager instances while preserving an original topology of the cloud-based secret manager instances are provided herein. An example system includes a computer-readable memory containing a local secret manager. The example system also includes a processing device configured to obtain an initial secret management topology from one or more cloud-based secret manager instances, associate each cloud-based secret manager instance with respective geographical locations, and migrate secrets from each respective cloud-based secret manager instance into the local secret manager, organized by the geographical locations, in a final secret management topology that mimics the initial secret management topology.

20 Claims, 6 Drawing Sheets

SECRETS MANAGEMENT TOPOLOGY MIGRATOR

BACKGROUND

Secret management systems are utilized by individuals and organizations to organize and control access to large quantities of secrets, including but not limited to passwords, keys, and tokens. Many secret management systems are cloud-based; multiple secret manager instances may run independently on geographically disparate machines. Such systems employ sets of routing rules to direct traffic in need of utilizing a particular secret to an appropriate secret manager instance that stores the particular secret.

SUMMARY

Systems, methods, and apparatuses are provided for migrating secrets from cloud-based secret manager instances to local secret manager instances while preserving an original topology of the cloud-based secret manager instances. In an example, a system comprises a computer-readable memory, in turn comprising a local secret manager, and a processing device configured to obtain an initial secret management topology from one or more cloud-based secret manager instances, associate each cloud-based secret manager instance with respective geographical locations, and migrate secrets from each respective cloud-based secret manager instance into the local secret manager, organized by the geographical locations, in a final secret management topology that mimics the initial secret management topology.

In another example, a method comprises obtaining an initial secret management topology from one or more cloud-based secret manager instances, associating each cloud-based secret manager instance with respective geographical locations, and migrating secrets from each respective cloud-based secret manager instance into a local secret manager, organized by the geographical locations, in a final secret management topology that mimics the initial secret management topology.

In yet another example, a non-volatile computer-readable memory stores instructions which, when executed by a processing device, cause the processing device to obtain an initial secret management topology from one or more cloud-based secret manager instances, associate each cloud-based secret manager instance with respective geographical locations, and migrate secrets from each respective cloud-based secret manager instance into a local secret manager, organized by the geographical locations, in a final secret management topology that mimics the initial secret management topology.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the Figures and the Detailed Description. Moreover, it should be noted that the language used in this specification has been principally selected for readability and instructional purposes, and not to limit the scope of the inventive subject matter.

BRIEF DESCRIPTION OF THE DRAWINGS

The description will be more fully understood with reference to the following figures, which are presented as exemplary aspects of the disclosure and should not be construed as a complete recitation of the scope of the disclosure, wherein.

DETAILED DESCRIPTION

Techniques are disclosed herein for automatically migrating secrets from cloud-based secret manager instances to local secret manager instances while preserving an original topology of the cloud-based secret manager instances. Many individuals and organizations that need to manage large numbers of secrets utilize secret managers to store, organize, and control access secrets. In many cases, secret manager systems may comprise many secret manager instances running on geographically disparate machines in a cloud configuration. Benefits of such an arrangement are numerous, including easy organization of secrets according to geographical relevance, but drawbacks exist as well. Increasingly, organizations and individuals utilizing cloud-based secret management systems find that superior control and security of sensitive information may be achieved by storing secrets locally on machines controlled by an organization that owns the secrets. Such an arrangement may reduce an organization or individual's dependence on external entities, augment security by keeping communication pathways that carry secrets internal to an organization and making unauthorized access more difficult, and potentially save on data storage fees to third-party entities. Issues can occur, however, during migration of secrets. Particularly, changes to a way secrets are stored and traffic is routed can cause user devices to be unable to locate a needed secret. For example, when device configurations and routing rules are dependent upon a geographically-organized secret management system that is migrated in a way that does not preserve said organization, an end user may find that devices are unable to retrieve passwords due to a need to reconfigure a way in which the devices try to locate secrets.

It is therefore desirable to implement a system that can easily and quickly migrate secrets from cloud-based secret manager instances into a local secret manager for local storage and operation. It is further desirable to implement such a system in a way that preserves organizational structures (topologies) present in current cloud-based secret manager systems in order to ensure minimum disruption to end users through any migration period and to preserve aforementioned benefits in structure such as geographical organization.

Figure 1:
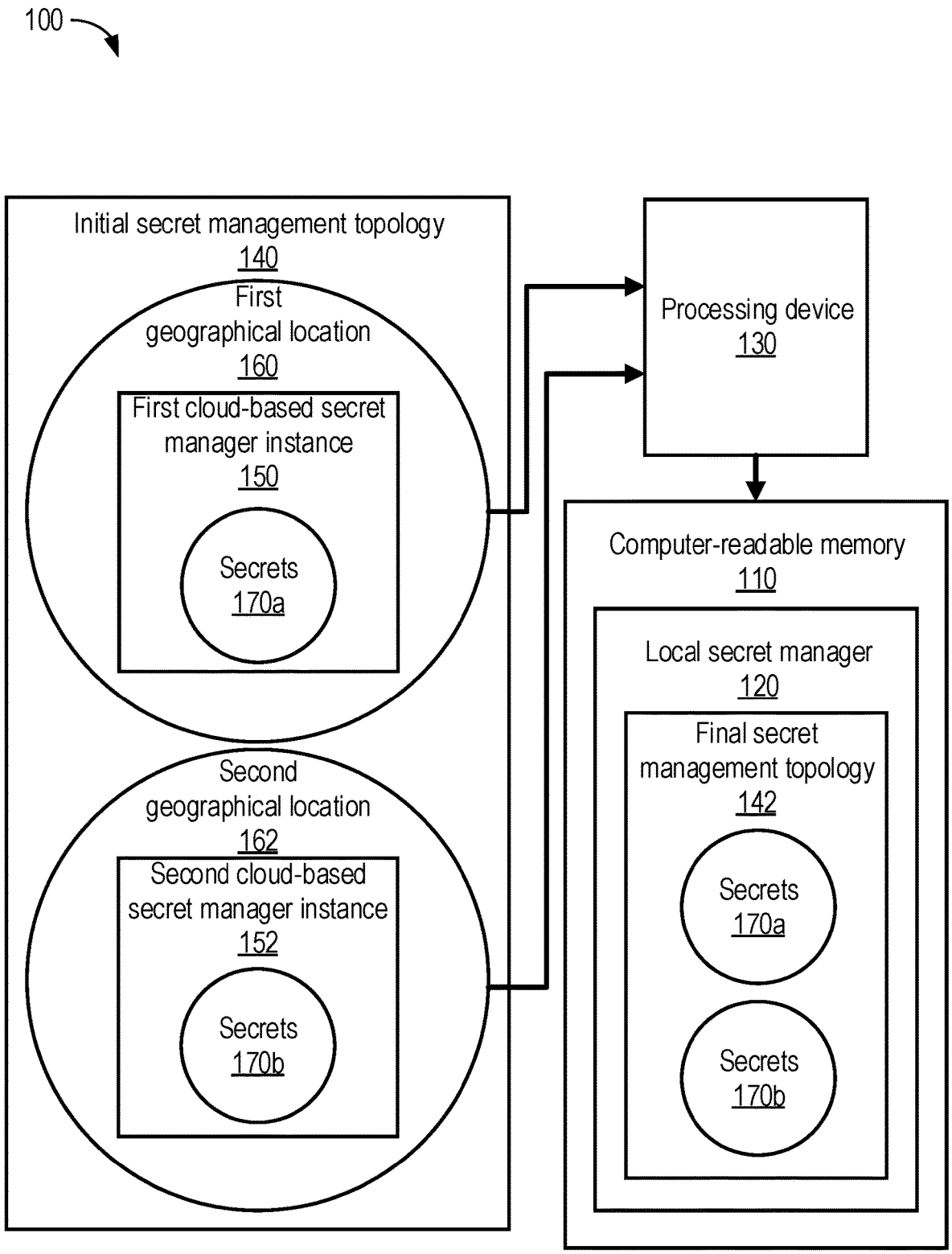
FIG. 1 illustrates an example system for migration of secrets, according to example embodiments of the present disclosure.

FIG. 1 illustrates an example system 100 for migration of secrets, according to example embodiments of the present disclosure. An initial secret management topology 140 comprises a first cloud-based secret manager instance 150 (first cloud instance 150) that contains a first subset of secrets 170a (collectively with a second subset of secrets 170b, secrets 170) running on a machine in a first geographical location 160 and a second cloud-based secret manager instance 152 (second cloud instance 152) that contains a second subset of secrets 170b running on a machine in a second geographical location 162. It will be appreciated that embodiments of the present disclosure may possess any number of cloud-based secret manager instances running on machines in any number of geographical locations, and that the system 100 illustrated in FIG. 1 is intended for example purposes only. The initial secret management topology 140 is accessed by a processing device 130 which also accesses a computer-readable memory 110.

The initial secret management topology 140 may be determined prior to migration. The processing device 130 may perform this task, or this task may be performed by an external system. The initial secret management topology 140 may be stored for reference when constructing the final secret management topology 142 and may take a form of any data structure capable of storing information about geographical locations, associated secret manager instances, and the secrets 170. As used in the present disclosure, "topology" is meant to refer to an arrangement or organizational structure of data. In the case of the initial secret management topology 140, this organizational structure involves physical locations of machines executing secret manager instances, but this is not always the case. For example, the final secret management topology 142 may replicate an organizational structure of the initial secret management topology 142 entirely within one geographical location by emulating the geographical locations of the initial secret management topology 140 in the computer-readable memory 110.

When in operation, the processing device 130 may retrieve the secrets 170, information about the first geographical location 160, and information about the second geographical location 162 from the first cloud instance 150 and the second cloud instance 152 respectively. Retrieval may take a form of the processing device 130 sending a message to the first cloud instance 150 and the second cloud instance 152, respectively, requesting secrets that are to be migrated, then receiving the secrets 170 from the first cloud instance 150 and the second cloud instance 152. The processing device 130 may employ an application programming interface (API) to communicate with the first cloud instance 150, the second cloud instance 152, or both.

The processing device 130 may associate the first subset of the secrets 170a that are retrieved from the first cloud instance 150 with the first geographical location 160, and may associate the second subset of secrets 170b that are retrieved from the second cloud instance 152 with the second geographical location 162. Associating a secret with a geographical location may involve storing the secret along with an identifier indicative of the geographical location. For example, the processing device 130 may store a secret in a data structure that pairs a secret with an identifier. The identifier may be a numerical value, a string, or any other form of data which may be used to associate a secret with a corresponding geographical location.

The processing device 130 may then migrate the secrets 170 into the local secret manager 120, employing geographical locations that have been associated with each of the secrets 170 in order to create a final secret management topology 142 within the computer-readable memory 110 that mimics the initial secret management topology 140. The processing device 130 may then update one or more routing rules and delete the first cloud instance 150 and the second cloud instance 152 (see FIG. 5).

In some example scenarios, the computer-readable memory 110 may contain the local secret manager 120 and a subset of the secrets 170 or additional secrets prior to a migration of the secrets 170 from the first cloud instance 150 and the second cloud instance 152. In this way, the local secret manager 120 may be added to with several migration events over an extended period of time. In such a scenario, duplicate secrets which exist in both the initial secret management topology 140 and the local secret manager 120 prior to a migration of a subset of the secrets 170 from the first cloud instance 150 and the second cloud instance 152 may be detected, and rather than copying the duplicate secrets into the local secret manager 120, the processing device 130 may simply update a routing rule to utilize the local secret manager 120 as opposed to the first cloud instance 150 or the second cloud instance 152.

In this example, the computer-readable memory 110 contains a local secret manager 120 that organizes a plurality of secrets 170 in a final secret management topology 142. In some example embodiments, however, the final secret management topology 142 may be achieved via a plurality of local secret managers 120 (see FIG. 2). The plurality of local secret managers 120 may execute in containers running in a target environment (see FIG. 2). The single local secret manager 120 illustrated in FIG. 1 may achieve the final secret management topology 142 by employing various arrangements of data structures. For example, the local secret manager 120 may employ multiple arrays, lists, linked lists, or any other data structures that each correspond to a geographical location associated with a subset of the secrets 170. In such an embodiment, subsets of the secrets 170 may be stored in a data structure corresponding to a geographical location of a cloud-based secret manager instance from which the subset of the secrets 170 was migrated. For example, the local secret manager 120 may employ a first data structure corresponding to the first geographical location 160 to store the first subset of the secrets 170a that have been migrated from the first cloud instance 150 and a second data structure corresponding to the second geographical location 162 to store the second subset of the secrets 170b that have been migrated from the second cloud instance 152.

Alternatively, the local secret manager 120 may employ a single data structure for storage of the secrets 170, pairing each secret with an identifier indicative of an associated geographical location. In such an embodiment, the local secret manager 120 may store geographical location identifier values in a lookup table that may be referenced when determining a geographical location associated with a secret (see FIG. 2). The lookup table may also be employed in embodiments where separate data structures for each geographical location. For example, each data structure may be paired with an identifier indicative of an associated geographical location, which may then be compared to geographical locations stored in the lookup table to determine a geographical location associated with a data structure. The same can be done for embodiments that employ multiple local secret manager instances; each local secret manager instance may be associated with an identifier indicative of an associated geographical location, which may then be compared to geographical locations stored in the lookup table to determine a geographical location associated with a secret manager instance (see FIG. 2).

Figure 2:
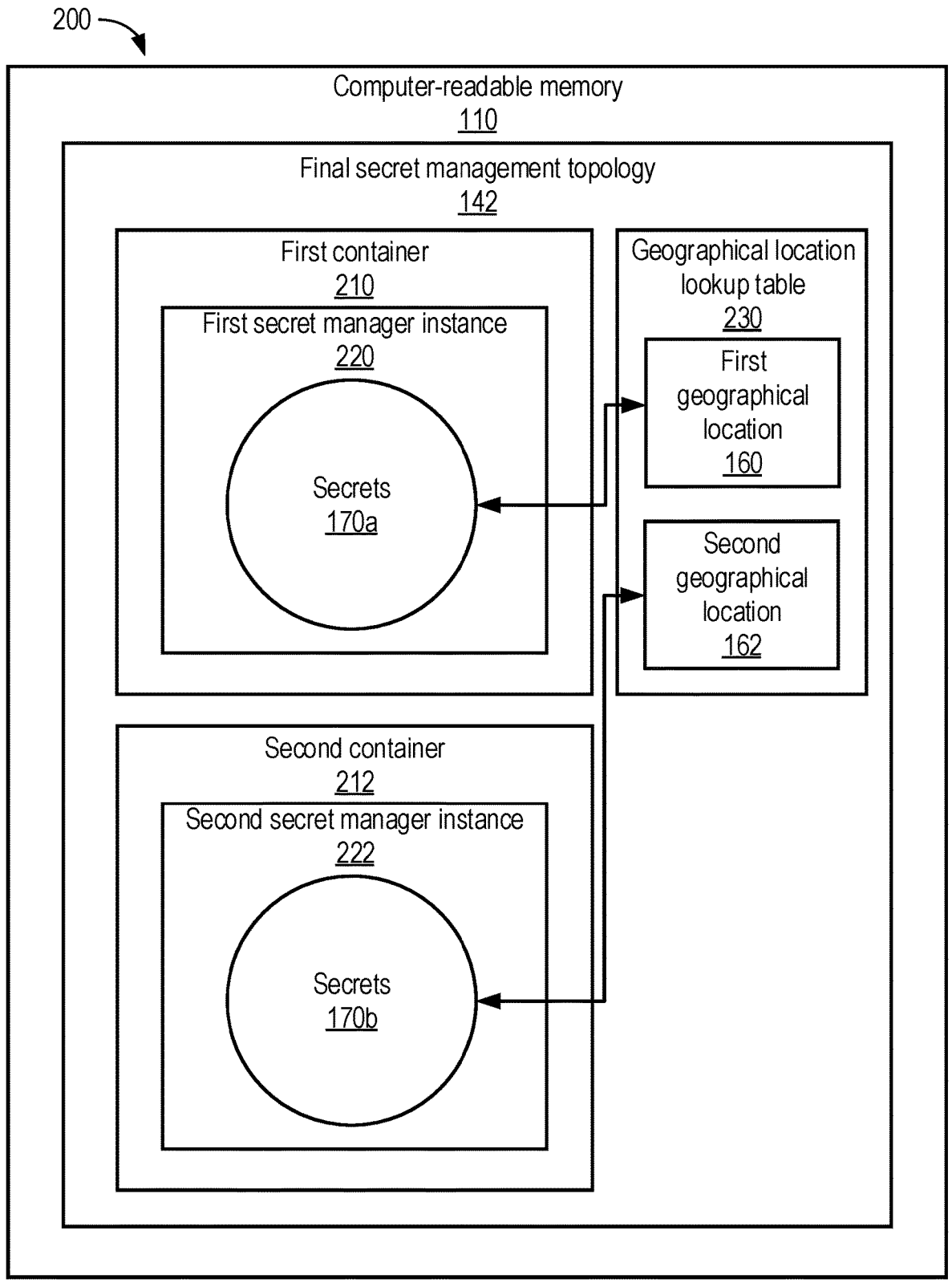
FIG. 2 illustrates an example computer-readable memory of an example system, according to example embodiments of the present disclosure.

FIG. 2 illustrates an example computer-readable memory 110 of an example system 200, according to example embodiments of the present disclosure. The computer-readable memory 110 contains a final secret management topology 142 that in turn comprises a first secret manager instance 220 executing in a first container 210 and a second secret manager instance 222 executing in a second container 212 and a geographical location lookup table 230. The first secret manager instance 220 and the second secret manager instance 222 contain a first subset of secrets 170a and a second subset of secrets 170b (collectively, secrets 170), which are associated with a first geographical location 160 and a second geographical location 162, respectively.

The geographical location lookup table 230 may contain information about the first geographical location 160 and the second geographical location 162 and a plurality of identifiers associated with geographical locations. The plurality of identifiers may in turn be stored with subsets of the secrets 170 so a geographical location of origin of a subset of secrets may be determined by referencing the geographical location lookup table 230.

The first container 210 and the second container 212 may execute in a target environment. For example, the first secret manager instance 220 and the second secret manager instance 222 may execute in separate virtualized environments (containers) that run locally in the target environment. In such a scenario, a plurality of containers may correspond directly with a plurality of geographical locations, with a container virtually simulating each geographical location from an initial secret management topology (see FIG. 1). Alternatively, each container and in turn each secret manager instance may contain multiple subsets of the secrets 170 associated with multiple geographical locations stored in the geographical location lookup table 230. For example, the first secret manager instance 220 may contain the first subset of secrets 170a and a portion of an additional subset of secrets associated with an additional geographical location.

A container of the plurality of containers may contain multiple secret manager instances. For example, the first container 210 may contain the first secret manager instance 220 in addition to an additional secret manager instance. The additional secret manager instance may contain a subset of the secrets 170 which is associated with a same geographical location as that of the first secret manager instance 220. The additional secret manager instance may contain a subset of the secrets 170 which is associated with one or more additional geographical locations, or combinations thereof.

Figure 3:
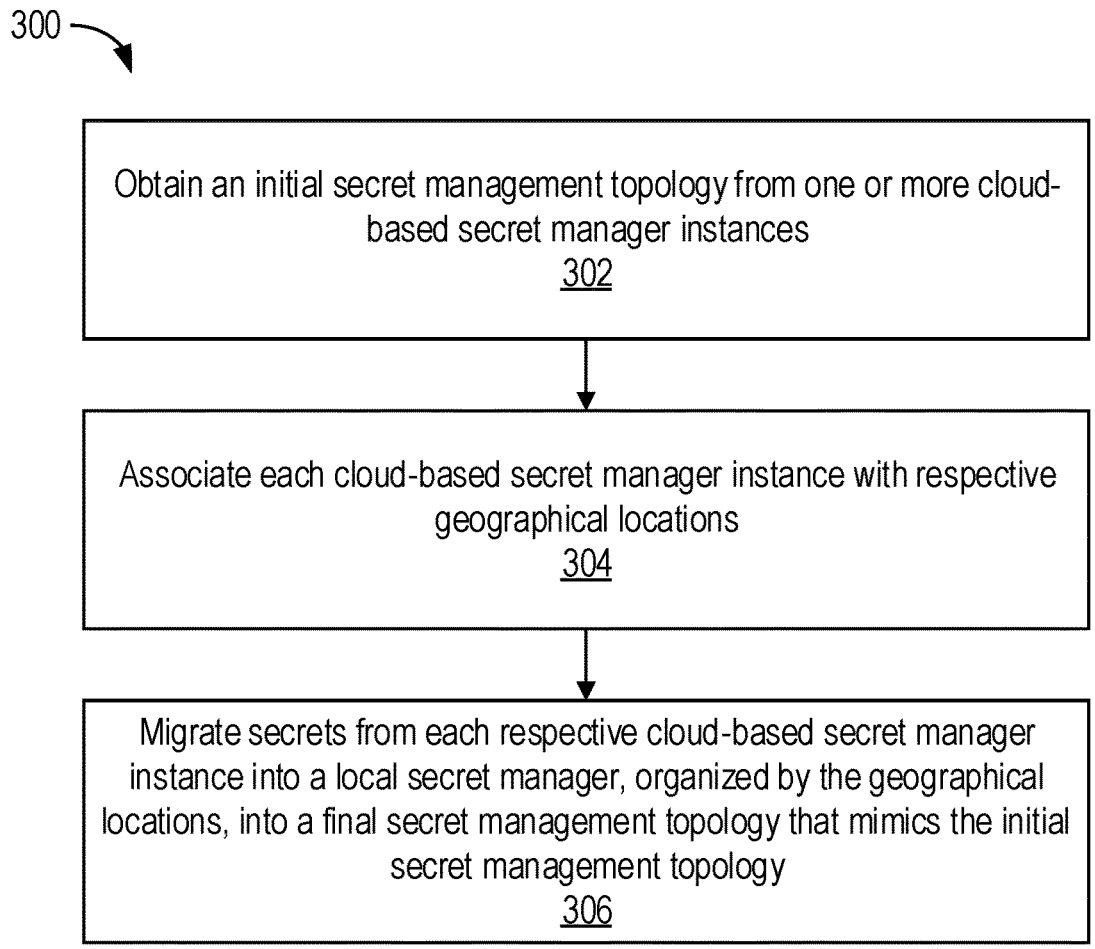
FIG. 3 illustrates an example method, according to example embodiments of the present disclosure.

FIG. 3 illustrates an example method 300, according to example embodiments of the present disclosure. It will be appreciated that the example method 300 is presented with a high level of abstraction and is for illustrative purposes only. Steps presented herein may, in practice, include additional actions or steps not discussed herein. Additionally, the method 300 may include additional steps not discussed herein.

At block 302, an example system obtains an initial secret management topology from one or more cloud-based secret manager instances. The initial secret management topology may include a plurality of secrets stored on secret manager instances running in various geographical locations. The initial secret management topology may be part of a larger secret management topology, some of which may have been previously migrated to one or more local secret managers. The system may be configured to poll a plurality of secret manager instances for geographical location data and stored secrets. The system may also be configured to inspect a set of routing rules to determine what cloud-based secret manager instances need to be polled. Alternatively to or in combination with inspecting the routing rules, the system may be configured to prompt a user for input in determining what cloud-based secret manager instances need to be polled. The system may also prompt the user for input confirming the initial secret manager topology after the initial secret management topology has been obtained. For example, the system may send a message to each cloud-based secret manager instance requesting data about the cloud-based secret manager instance. This data may comprise a number of stored secrets, geographical location data, metadata about stored secrets, data about a cloud service provider, any other data about the cloud-based secret manager instance, or combinations thereof. The system may then display collected data in a summary and prompt the user for confirmation that a correct topology has been determined. The system may allow the user to edit the collected data before saving the collected data to a memory. The collected data may be used to construct a final secret management topology.

At block 304, the system associates each cloud-based secret manager instance in the initial secret management topology with a respective geographical location. In embodiments that utilize a geographical location lookup table (see FIG. 2), this process may involve adding identifiers and data about geographical locations that aren't already stored in the lookup table to the lookup table (see FIG. 4). The system may be configured to individually associate each secret of a plurality of secrets stored in a cloud-based secret manager with a geographical location of the cloud-based secret manager. For example, the system may be configured to store an identifier indicative of the geographical location of the cloud-based secret manager with a password obtained from the cloud-based secret manager.

At block 306, the system migrates secrets from each respective cloud-based secret manager instance into a local secret manager, organized by geographical locations, into a final secret management topology that mimics the initial secret management topology. For example, the system may send a request to the cloud-based secret manager instance for a password, and the cloud-based secret manager instance may send the password to the system. The system may hold the password in an intermediate memory or data structure while acquiring other secrets and performing the tasks at blocks 302 and 304. Communication between the system and the cloud-based secret manager may be facilitated by an application programming interface (API). The system may then store the password in a local computer readable memory 110 (see FIG. 1, FIG. 2) and update a routing rule or set of routing rules to redirect traffic that would previously have been directed to the cloud-based secret manager instance. For example, the system may send a message to a server to update the routing rule or set of routing rules to redirect traffic for the password to the local secret manager 120 (see FIG. 1).

The system may associate local secret manager instances with respective geographical locations that mirror those of cloud-based secret manager instances in the initial secret management topology. The system may associate individual secrets with respective geographical locations. In such a scenario, the system may be configured to store a geographical identifier with each secret indicative of a geographical location of the secret within the initial secret management topology.

The system may implement the final secret management topology in a number of ways which are discussed in greater depth in the descriptions of FIG. 1 and FIG. 2. The system may be configured to prompt a user for a determination how to implement the final secret management topology. The system may be configured to check if a secret is already present in the local secret manager before migrating the secret, and responsive to the secret being present in the local secret manager, the system may be configured to update routing rules to utilize the local secret manager rather than migrating the secret. The system may then exit the method 300 or loop back to block 302 to obtain and migrate an additional topology.

Figure 4:
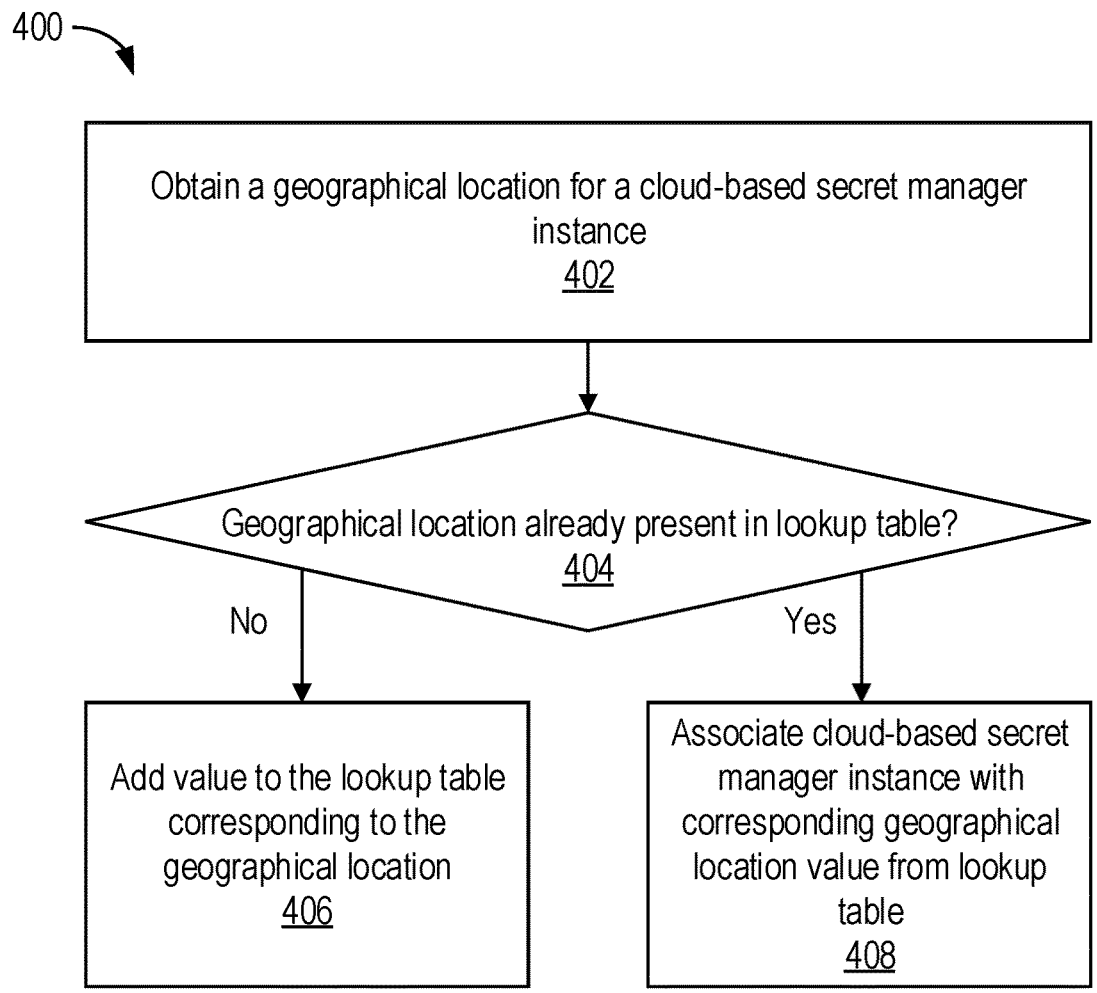
FIG. 4 illustrates an example method for managing a lookup table of geographical locations, according to example embodiments of the present disclosure.

FIG. 4 illustrates an example method 400 for managing a lookup table of geographical locations, according to example embodiments of the present disclosure. It will be appreciated that the example method 400 is presented with a high level of abstraction and is for illustrative purposes only. Steps presented herein may, in practice, include additional actions or steps not discussed herein. Additionally, the method 400 may include additional steps not discussed herein.

At block 402, an example system obtains a geographical location of a cloud-based secret manager instance. This may be part of the system obtaining a wider initial secret management topology (see FIG. 1, FIG. 3). The system may obtain the geographical location from the cloud-based secret manager instance itself, a directory of cloud-based secret manager instances, or any other source of geographical information regarding the cloud-based secret manager instance.

For example, the system may send a message to the cloud-based secret manager instance requesting a city name, a latitude and longitude, a state or province name, a country name, a continent name, any other geographically identifying information, or combinations thereof. The cloud-based secret manager instance may be unable to provide all requested information, in which case the system may be configured to send a message to a cloud hosting service of the cloud-based secret manager instance, perform an internet protocol (IP) address trace, or perform any other action to determine desired information about the geographical location. The system may store information about the geographical information in a local memory.

At block 404, the system checks a lookup table to determine whether the geographical location obtained in block 402 is already present in the lookup table. The lookup table may be any form of data structure, including but not limited to an array, a linked list, an object-oriented class, or combinations thereof. The system may search the lookup table for geographical location data that matches the geographical location. The system may be configured to search for an exact match of all information about the geographical location, or may be configured to search for a match that is within a predetermined similarity threshold. For example, when a geographical location within the lookup table is within a certain radius of distance of the geographical location, the system may be configured to determine that a match exists.

It may be desirable to implement a radius threshold in situations where a single unit of a larger entity (i.e. an office of a company) stores secrets in multiple cloud-based data centers within a geographical area that is small relative to the wider initial secret management topology. For example, a company may have four facilities spread across a continent which each store secrets in one or more cloud-based secret manager instances that execute on machines that are geographically close to the four facilities. A facility of the four facilities may have secrets stored on two or more cloud-based secret manager instances executing in two or more data centers in a region of the facility. When migrating the company's secrets from cloud-based secret managers to a local secret manager, it may be desirable to preserve macro-scale geography (i.e. a region of the cloud-based secret manager instance) but simultaneously undesirable to preserve micro-scale geography (i.e. the two or more data centers in a same region). It may therefore be desirable to condense cloud-based secret manager instances which belong to a same facility or are geographically close in order to save computing resources and reduce complexity of a final secret management topology.

The cloud-based secret manager instance may compare information about the geographical location obtained in block 402 with entries in the lookup table to determine if a match exists. When multiple pieces of information about the geographical location exist (i.e. a city name, latitude and longitude, and country name), the system may compare one or more of the pieces of information with entries in the lookup table. The system may be configured to determine that a match exists when at least one of the pieces of information is similar or identical to an entry in the lookup table, when a threshold number of pieces of information or more are similar or identical to an entry in the lookup table, or when all pieces of information match are similar or identical to entry in the lookup table. In the present context, a piece of information may be determined to be "similar" to an entry in the lookup table if the piece of information indicated a geographical location within a certain radius of the entry, is a string that matches the entry closely enough that a difference could be a result of an error in typography, otherwise exceeds a predetermined threshold of similarity, or combinations thereof.

When a match exists, the system proceeds to block 408. When a match does not exist, the system proceeds to block 406.

At block 406, the system adds an identifier value to the lookup table corresponding to the geographical location from block 402. The system may also be configured to add the information about the geographical location obtained in block 402 to the lookup table. The system may at this point associate the cloud-based secret manager instance with the geographical location by storing the identifier value with information about the cloud-based secret manager instance. The identifier value may be a numerical value, string, character, or any other piece of data suitable for identifying the geographical location. The identifier value may be sequentially issued, randomly generated, based upon the information about the geographical location, or created by any other method. The system may then loop back to block 402 to obtain a new geographical location for another cloud-based secret manager instance or may proceed to begin migrating secrets (see FIG. 3).

For example, the system may generate an identifier of "3" for the geographical location and store the identifier in the lookup table along with a city name of "exampleville", a country name of "examplia", and a cloud service provider of "exampco". When referencing secrets associated with the geographical location in the future, the system can quickly and easily determine that secrets from the cloud-based secret manager instance were previously stored on a "exampco"—operated machine located in "exampleville" in the country of "examplia".

At block 408, the system associates the cloud-based secret manager instance with the geographical location from block 402. This may be achieved by storing an identifier value with information about the cloud-based secret manager instance. The identifier value already exists in the lookup table, as determined at block 404, so no other action may need to be taken by the system. The system may then loop back to block 402 to obtain a new geographical location for another cloud-based secret manager instance or may proceed to begin migrating secrets (see FIG. 3).

For example, the system may store secrets from the cloud-based secret manager instance in a table that is reserved for secrets from the geographical location. In another example, the system may add the secrets from the cloud-based secret manager instance to an existing local secret manager instance which has the identifier value stored in a data structure that describes the local secret manager instance. In yet another example, the system may add the secrets from the cloud-based secret manager instance to an existing local secret manager instance which has the identifier value stored in a data structure that describes a container in which the local secret manager instance runs.

Figure 5:
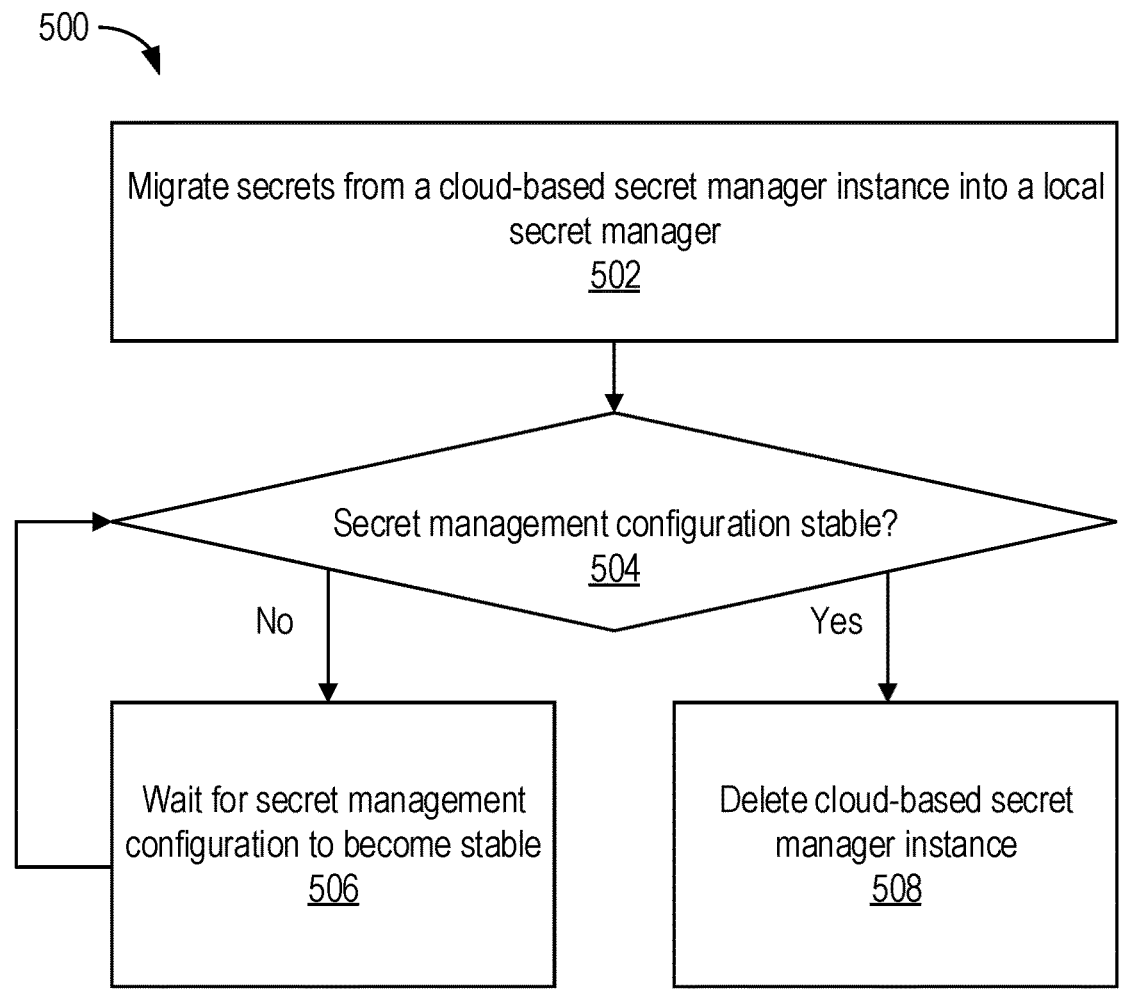
FIG. 5 illustrates an example method for deleting cloud-based secret manager instances, according to example embodiments of the present disclosure.

FIG. 5 illustrates an example method 500 for deleting cloud-based secret manager instances, according to example embodiments of the present disclosure. It will be appreciated that the example method 500 is presented with a high level of abstraction and is for illustrative purposes only. Steps presented herein may, in practice, include additional actions or steps not discussed herein. Additionally, the method 500 may include additional steps not discussed herein.

At block 502, an example system migrates secrets from a cloud-based secret manager instance into a local secret manager. Migration processes are discussed in further detail in FIG. 1 and FIG. 3. Migration of secrets from the cloud-based secret manager instance may need to be complete before the system can proceed.

For example, the system may, upon determining that all secrets that have been received from the cloud-based secret manager instance have been migrated into the local secret manager, send a message to the cloud-based secret manager instance requesting all secrets stored on the cloud-based secret manager instance. The system may then receive secrets from the cloud-based secret manager instance which can be compared with secrets stored in the local secret manager to determine whether a complete set of secrets has been migrated. The system then proceeds to block 504.

At block 504, the system checks to see if a current secret management configuration is stable. Checking may entail testing access to secrets which have been migrated. For example, the system may inspect a routing rule or set of routing rules to verify that requests to access migrated secrets are being routed to the local secret manager. The system may then request the secrets which have been migrated via the routing rule or set of routing rules and compare a resulting set of secrets to an original set of secrets from the cloud-based secret manager instance. The system may determine that the current secret management configuration is stable when the routing rule or set of routing rules are configured to route traffic to the local secret manager and the comparison of secrets determines that the original set of secrets has been properly migrated.

When the system determines that the current secret management configuration is not stable, the system proceeds to block 506. When the system determines that the current secret management configuration is stable, the system proceeds to block 508.

At block 506, the system waits for the current secret management configuration to become stable. While waiting, the system may proceed with other processes such as migrating secrets, updating routing rules, and gathering and storing information about secret management topologies. The system may be configured to identify why the current secret manager configuration is not stable, and may be further configured to remedy an issue. For example, the system may be configured to detect that a routing rule is still configured to route traffic to the cloud-based secret manager instance rather than the local secret manager. In such a situation, the system may be configured to update the routing rule to route traffic to the local secret manager. When this action is performed, but the local secret manager does not contain a corresponding secret, subsequent determinations at block 504 may detect that a resulting set of secrets does not match the original set of secrets. The system may then be configured to migrate a missing secret or secrets to the local secret manager. The system then proceeds to block 504.

At block 508, the system deletes the cloud-based secret manager instance. In many situations it may be desirable to remove the cloud-based secret manager instance because leaving the cloud-based secret manager instance as-is may degrade security of secrets held in the cloud-based secret manager instance. The system may send instructions to a cloud-based system to delete the cloud-based secret manager instance. The system may also prompt a user for confirmation before deleting the cloud-based secret manager instance.

For example, the system may present a user with a summary of secrets which have been migrated and request permission from the user for deletion of the cloud-based secret manager instance. The summary may include other information about the cloud-based secret manager instance, such as but not limited to information about a geographical location of the cloud-based secret manager instance, information about a hosting service of the cloud-based secret manager instance, or version information about the cloud-based secret manager instance. Upon receiving confirmation from the user, the system deletes the cloud-based secret manager instance. The system may then proceed to block 502 to migrate additional secrets, or may proceed to perform any other tasks.

Figure 6:
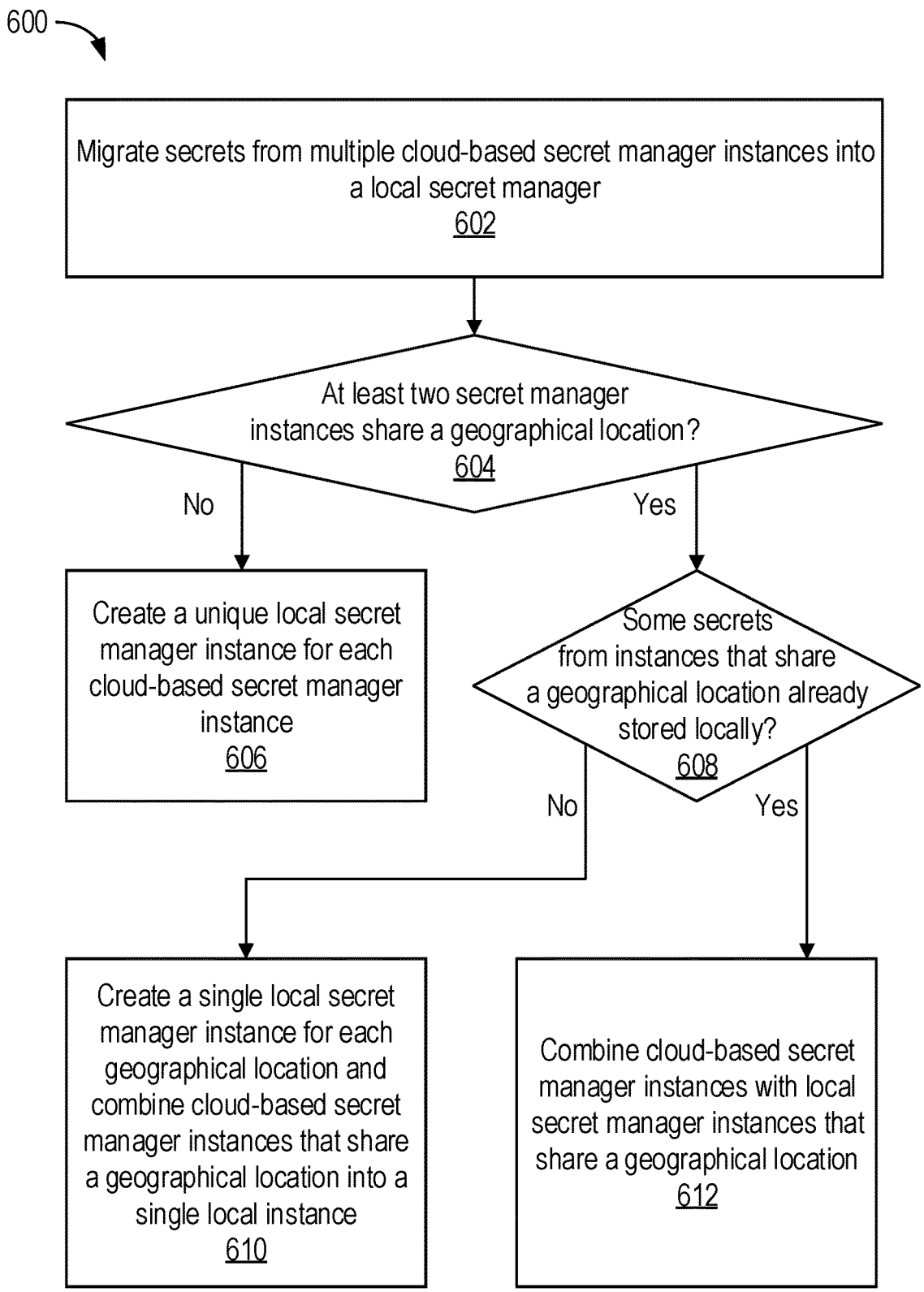
FIG. 6 illustrates an example method for condensing migrated secrets, according to example embodiments of the present disclosure.

FIG. 6 illustrates an example method 600 for condensing migrated secrets, according to example embodiments of the present disclosure. It will be appreciated that the example method 600 is presented with a high level of abstraction and is for illustrative purposes only. Steps presented herein may, in practice, include additional actions or steps not discussed herein. Additionally, the method 600 may include additional steps not discussed herein.

At block 602, an example system begins migrating secrets from multiple cloud-based secret manager instances into a local secret manager. Migration processes are discussed in further detail in FIG. 1 and FIG. 3. For example, the system may be configured to simultaneously migrate secrets from two or more cloud-based secret manager instances. The system proceeds to block 604.

At block 604, the system determines whether two secret manager instances share a geographical location. The system may accomplish this by searching a lookup table for geographical locations that match a geographical location of a cloud-based secret manager instance (see FIG. 4). The system may be configured to search for an exact match, or may be configured to search for a match that is within a predetermined similarity threshold. For example, when a geographical location within the lookup table is within a certain radius of distance of the geographical location, the system may be configured to determine that a match exists. The system may perform a comparison between two cloud-based secret manager instances to determine if a shared geographical location exists. Such a comparison may employ the same criteria as comparisons between cloud-based secret manager instance locations and locations in the lookup table.

For example, a first cloud-based secret manager instance may be located in "exampleville" and a second cloud-based secret manager instance may be located in "exampleboro". In this example, "exampleboro" is a suburb located five miles outside of "exampleville". The system may be configured with a threshold of a 10 mile radius for considering two geographical locations to be shared. In such a scenario, the system may determine that "exampleville" matches "exampleboro" even though a character-for-character match does not exist. Alternatively, the system may be configured with no distance threshold for considering two geographical locations to be shared. In such a scenario, the system may determine that "exampleville" does not match "exampleboro". A local secret manager instance, however, may be associated with "exampleville", in which case the system may determine a match exists regardless of configuration with regard to a distance threshold.

When a match does not exist, the system proceeds to block 606. When a match does exist, the system proceeds to block 608.

At block 606, the system creates a unique local secret manager instance for each cloud-based secret manager instance. The system may also add entries in the lookup table corresponding to geographical locations of each cloud-based secret manager instance (see FIG. 4). In some embodiments, rather than creating a separate local secret manager instance for each cloud-based secret manager instance, the system may be configured to associate individual secrets with appropriate geographical identifiers, then store those secrets together in a single secret manager instance (see FIG. 1).

For example, the system may create a first local secret manager instance for the first cloud-based secret manager instance and associate the first local secret manager with an identifier indicative of "exampleville" as a geographical location, and create a second local secret manager instance for the second cloud-based secret manager instance and associate the second local secret manager with an identifier indicative of "exampleboro" as a geographical location. The system may add entries in the lookup table corresponding to "exampleville" and "exampleboro". The system may then loop back to 602 to migrate more secrets, or may proceed to perform any other task.

At block 608, the system determines whether some secrets from instances that share a geographical location are already stored locally. Situations may arise where one or more cloud-based secret manager instances share a geographical location with a local secret manager instance or possess a geographical location which is already present in the lookup table (see FIG. 4). The system may determine whether this is the case by comparing locations of cloud-based secret manager instances with geographical locations present in the lookup table to determine if a match exists (see FIG. 4). For example, a local secret manager instance may be associated with "exampleville", in which case the system may determine that a match exists with at least the first cloud-based secret manger.

When a match does not exist, the system proceeds to block 610. When a match exists, the system proceeds to block 612.

At block 610, the system creates a single local secret manager instance or adds a single identifier to the lookup table (see FIG. 4) for each geographical location and combines cloud-based secret manager instances that share a geographical location into a single local secret manager instance. The system may combine cloud-based secret manager instances by simply copying secrets from each cloud-based secret manager instance into a single local secret manager instance, or by associating secrets from each cloud-based secret manager instance with a same geographical location. For example, the system may create a combined "exampleville/exampleboro" local secret manager instance and add a combined "exampleville/exampleboro" entry to the lookup table. The system may then migrate secrets from the first cloud-based secret manager instance and the second cloud-based secret manager instance into the combined "exampleville/exampleboro" local secret manager instance. The system may then loop back to 602 to migrate more secrets, or may proceed to perform any other task.

At block 612, the system combines cloud-based secret manager instances with local secret manager instances that share a geographical location with the cloud-based secret manager instances. For example, when two cloud-based secret manager instances share a geographical location with a local secret manager instance, secrets from the two cloud-based secret manager instances may be added to the local secret manager instance so that the local secret manager instance contains all secrets from the two cloud-based secret manager instances and the local secret manager instance as originally configured. For example, the system may migrate secrets from the first cloud-based secret manager instance into a local secret manager associated with "exampleville". Depending on a distance threshold configuration of the system, the system may also migrate secrets from the second cloud-based secret manager instance into the local secret manager associated with "exampleville". In cases where the system does not, the system may create an "exampleboro" local secret manager instance into which secrets from the second cloud-based secret manager instance may be migrated by the system. The system may then loop back to 602 to migrate more secrets, or may proceed to perform any other task.

It will be appreciated that all of the disclosed methods and procedures described herein can be implemented using one or more computer programs, components, and/or program modules. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures. As will be appreciated by one of skill in the art, the functionality of the program modules may be combined or distributed as desired in various aspects of the disclosure.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced otherwise than specifically described without departing from the scope and spirit of the present disclosure. Thus, embodiments of the present disclosure should be considered in all respects as illustrative and not restrictive. It will be evident to the annotator skilled in the art to freely combine several or all of the embodiments discussed here as deemed suitable for a specific application of the disclosure. Accordingly, the scope of the invention should be determined not by the embodiments illustrated, but by the appended claims and their equivalents.

What is claimed:

1. A system, comprising:
   a computer-readable memory comprising a local secret manager; and
   a processing device, configured to
      obtain an initial secret management topology from one or more cloud-based secret manager instances,
      associate each cloud-based secret manager instance with respective geographical locations, and
      migrate secrets from each respective cloud-based secret manager instance into the local secret manager, organized by the geographical locations, in a final secret management topology that mimics the initial secret management topology.

2. The system of claim 1, wherein the final secret management topology includes a plurality of secret manager instances that run locally.

3. The system of claim 2, wherein the plurality of secret manager instances execute in containers running in a target environment.

4. The system of claim 1, wherein the geographical locations are stored as values in a lookup table, and wherein responsive to a cloud-based secret manager instance being associated with a geographical location that is not already present in the lookup table, the processing device is configured to add a value to the lookup table corresponding to the geographical location that is not already present in the lookup table.

5. The system of claim 1, wherein the processing device is configured to delete a cloud-based secret manager instance after migrating secrets from the cloud-based secret manager instance into the local secret manager.

6. The system of claim 5, wherein the processing device is configured to wait until a secret management configuration is stable before deleting the cloud-based secret manager instance.

7. The system of claim 1, wherein the processing device is configured to check if a secret is already stored in the local secret manager before migrating the secret from a cloud-based instance, and responsive to determining that the secret is already stored locally, redirect traffic from the cloud-based instance to a local instance by updating at least one routing rule.

8. The system of claim 7, wherein the processing device is configured to combine secrets that are already stored locally with secrets that are not already stored locally into a single local instance.

9. The system of claim 1, wherein the processing device is configured to combine secrets from multiple cloud-based secret manager instances that are associated with a same geographical location into a single local instance.

10. The system of claim 1, wherein the processing device is configured to update at least one routing rule.

11. A method, comprising:
    obtaining an initial secret management topology from one or more cloud-based secret manager instances;
    associating each cloud-based secret manager instance with respective geographical locations; and
    migrating secrets from each respective cloud-based secret manager instance into a local secret manager, organized by the geographical locations, in a final secret management topology that mimics the initial secret management topology.

12. The method of claim 11, further comprising storing the geographical locations as values in a lookup table, and responsive to a cloud-based secret manager instance being associated with a geographical location that is not already present in the lookup table, adding a value to the lookup table corresponding to the geographical location that is not already present in the lookup table.

13. The method of claim 11, further comprising deleting a cloud-based secret manager instance after migrating secrets from the cloud-based secret manager instance into the local secret manager.

14. The method of claim 11, further comprising checking if a secret is already stored in the local secret manager before migrating the secret from a cloud-based instance, and responsive to determining that the secret is already stored locally, redirecting traffic from the cloud-based instance to a local instance by updating at least one routing rule.

15. The method of claim 11, further comprising combining secrets from multiple cloud-based secret manager instances that are associated with a same geographical location into a single local instance.

16. The method of claim 11, further comprising updating at least one routing rule.

17. A non-volatile computer-readable memory storing instructions which, when executed by a processing device, cause the processing device to:
    obtain an initial secret management topology from one or more cloud-based secret manager instances;
    associate each cloud-based secret manager instance with respective geographical locations; and
    migrate secrets from each respective cloud-based secret manager instance into a local secret manager, organized by the geographical locations, in a final secret management topology that mimics the initial secret management topology.

18. The non-volatile computer-readable memory of claim 17, containing further instructions which, when executed, cause the processing device to store the respective geographical locations as values in a lookup table, and responsive to a cloud-based secret manager instance being associated with a geographical location that is not already present in the lookup table, add a value to the lookup table corresponding to the geographical location that is not already present in the lookup table.

19. The non-volatile computer-readable memory of claim 17, containing further instructions which, when executed, cause the processing device to delete a cloud-based secret manager instance after migrating secrets from the cloud-based secret manager instance into the local secret manager.

20. The non-volatile computer-readable memory of claim 17, containing further instructions which, when executed, cause the processing device to update at least one routing rule.

* * * * *